Jan. 7, 1964  I. I. MARKEVITCH  3,116,501
METHOD OF MAKING SHOES
Filed Dec. 7, 1961
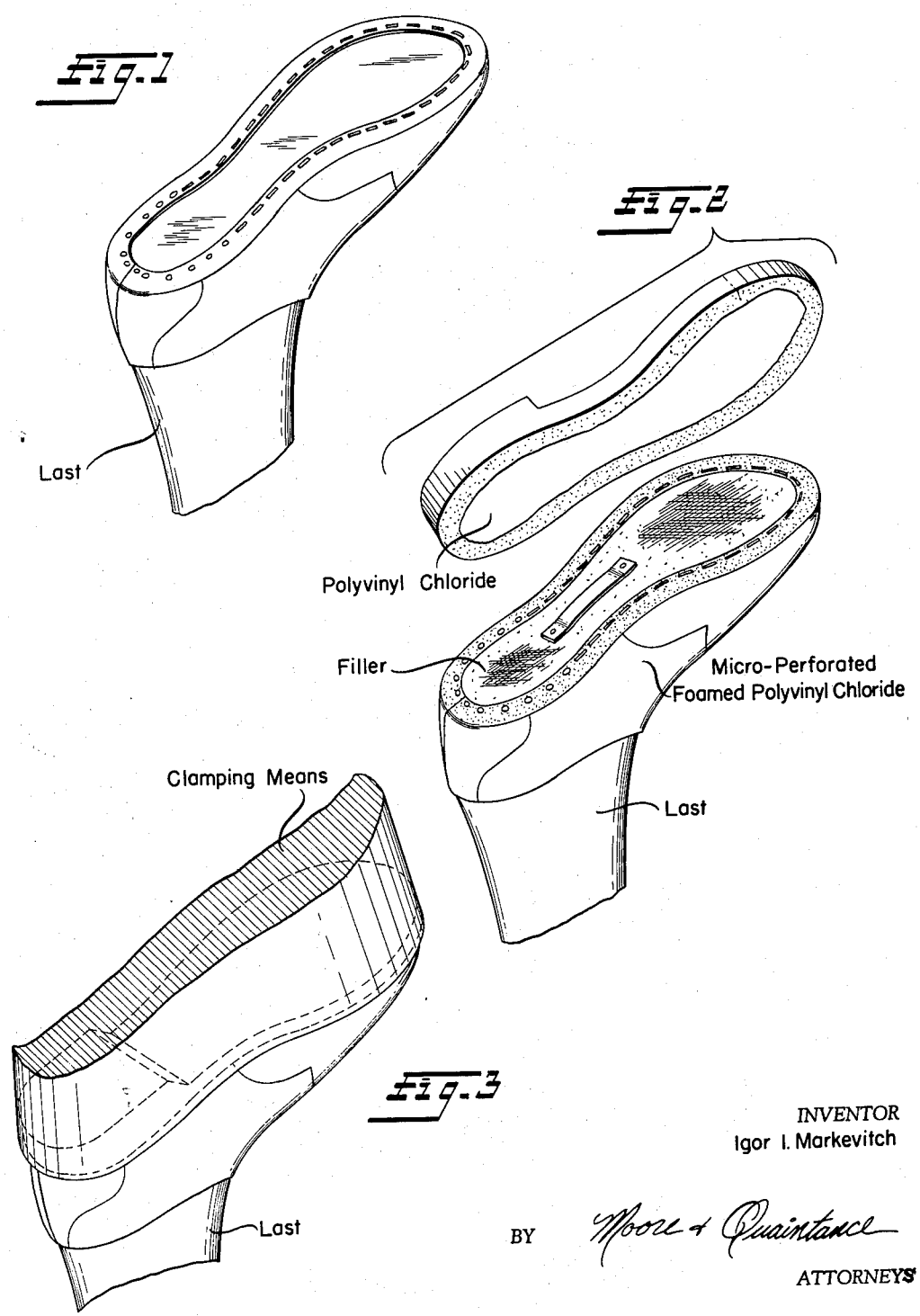
INVENTOR
Igor I. Markevitch _United States Patent Office_ 3,116,501
Patented Jan. 7, 1964

3,116,501
METHOD OF MAKING SHOES
Igor Ivan Markevitch, Pompton Lakes, N.J., assignor to Arnav Industries, Inc., Little Ferry, N.J., a corporation of Delaware
Filed Dec. 7, 1961, Ser. No. 157,646
5 Claims. (Cl. 12—142)

This invention relates to improvements in methods of making shoes and, more particularly, to improvement in methods of adhesively bonding soles, heels or soles and heels to shoe uppers.

Efforts have heretofore been made to adhesively bond soles, heels, or soles and heels to shoe uppers with synthetic resins. For example, one such method is disclosed in United States Patent 2,601,007. It has been found, however, that whenever the upper, the sole, the heel, the sole and heel, or any combination thereof, is made of a plastic material containing a plasticizer, such as a plasticized resin or other polymeric material, generally designated herein as plasticized polymeric materials, the bond is customarily destroyed by the migration of the solvent into the material binding the upper to the sole or the like.

Now it has been found that polyurethane adhesives may be used to effectively and permanently adhesively bond a heel, a sole, or a sole and heel to a shoe upper even though any, or all, of these parts of the shoe contain a plasticizer. Basically considered, the uppers and soles, or soles and heels, are positioned in assembled, or mating relation, with the polyurethane adhesive therebetween and then the assembly is subjected to treatment which induces the adhesive to polymerize further or cure. While a theoretical basis for the function of the polyurethane adhesive is not necessary to an understanding of the invention, it is felt the polyurethane does not absorb any plasticizer and, as a result, acts as an effective barrier to the migration, or bleed out, of plasticizers which it is believed have heretofore served to weaken, or even ultimately destroy, the adhesive bond between the shoe upper and the sole or the like. The present invention has special applicability to highly plasticized soles and heels such as those derived from polyvinyl chloride. It is known, that the desirable plasticizer content for typical plastic uppers and for plastic heels and soles is quite different. Thus the present invention also has special applicability to the bonding of uppers made of plasticized polymeric materials to plasticized soles and heels of a like nature. Yet it should be understood, the present invention provides a stable and positive bond regardless of the plasticizer content of the shoe materials being bonded together.

In general, polyurethanes heretofore found useful as adhesives may be used in the process of this invention although certain types function especially well. For instance, the preferred polyurethanes are polymers produced by the addition reaction between polyisocyanates, i.e., those that are difunctional or higher, and compounds rich in hydroxyl groups, i.e., two or more hydroxyl groups, including polyols such as glycols and especially polyethers and polyesters containing terminal hydroxy groups. Such polyols and polyisocyanates react in a known way without the production of interfering by-products, such as $CO_2$, which is produced when urethanes are reacted with water or acid-rich compounds. Tolylene (more aptly toluylene) diisocyanate and diphenylmethane-4,4'-diisocyanate have proven very satisfactory as polyisocyanates and, as stated, hydroxy-rich polyethers and esters have proven quite satisfactory as the polyols. Typically the polyhydroxy ethers, such as those derivable from ethylene glycol and higher molecular weight glycols have a molecular weight of 400–600 and higher, say 1000 and more. For instance, a very satisfactory adhesive for the purposes of this invention is obtainable from tolylene diisocyanate (TDI) and an ether glycol (C-4). Also satisfactorily adhesive polyurethanes can be derived from hydroxyrich castor oil and diphenyldimethylene-4,4'-diisocyanate.

The polyurethane adhesive is most advantageously used in its incompletely polymerized phase, usually known as a prepolymer, and then subjected to a cure in situ. In other words, the incompletely polymerized polyurethane is first applied to the uppers and/or the sole and the soles and uppers positioned in assembled, or mating relationship, and then the polyurethane is subjected to a further polymerization, or cure.

In a particular application of the invention, an incompletely polymerized polyurethane was obtained from the following ingredients in the indicated parts by mole.

| | Moles |
|---|---|
| Tolylene diisocyanate | 1 |
| Polytetramethyletherglycol (C-4) | 1.1 |

This incompletely polymerized polyurethane was activated by mixing in 12 parts of 4,4'-methylene-bis(2-chloraniline) and disolved in tetrahydrofuran (butylene oxide) so as to obtain a solution containing 19% solids to 81% tetrahydrofuran. It was found such a solution can be kept up to three months provided it is kept in a sealed container out of contact with air and the resulting moisture.

The above noted adhesive was utilized to adhesively bind a preformed polyvinyl chloride sole and heel to an upper composed of a foamed polyvinyl chloride having a microperforated thin outer surface lamina of polyvinyl chloride and a cloth inner surface lamina constituting a shoe innerliner in the manner set out below. First an upper with a conventional innersole was assembled on a last in any desired way. Then, in a known way, the area between the area of innersole overlapped by the upper was filled in with a conventional filler to form a firm support for the foot. The shoe upper overlapping the innersole was roughened mechanically and the above identified adhesive applied. (The shoe upper could also be roughened with a solvent.) The adhesive can be applied in any desired way as mechanically with automated machinery or manually as with a brush. After the adhesive was applied, the shoe upper was set aside until it dried by the evaporation of the solvent. In the same way, a preformed polyvinyl chloride sole and heel assembly was prepared by roughing it along its periphery and then applying the polyurethane adhesive solution thereto. Of course, the polyurethane adhesive solution can be applied all over the sole and heel and all over the bottom of the shoe upper but peripheral application has been found adequate.

When the adhesive solutions as applied above were dry, the polyurethane adhesive on at least one of the surfaces was activated by the application of heat as by high wattage incandescent lamps, infra-red heat or a calrod oven. Upon the adhesive becoming tacky, the heating was discontinued and the upper and sole and heel were brought into alignment in assembled, or mating, relationship. Then pressure of 325 p.s.i. was applied for 12 seconds and a permanent and stable bond was thereby established between the sole and the heel and the upper.

The significance of the above exemplification of the invention will be further understood from the accompanying perspective drawings provided with appropriate legends, wherein:

FIG. 1 shows a shoe upper mounted on a last;
FIG. 2 shows the shoe upper of FIG. 1 and a preformed sole and heel with polyurethane adhesive applied to each and ready for assembly; and FIG. 3 shows the shoe upper and the sole and heel in mating relationship and under pressure to facilitate the formation of the intersurface bond.

While the invention has been described with reference to the bonding of plasticized synthetic resin uppers to a preformed plasticized synthetic resin sole, it will be understood the invention has important applications wherever plasticizer migration is a problem, namely, wherever a plasticized polymeric material is used in shoe surfaces which may be adhesively bonded to one another. Thus the sole alone or the heel alone may be adhesively bonded to the upper in the manner described. Also, for example, the present process can be used to insert a polyurethane as an adhesive and a plasticizer barrier layer between an injection molded upper and a subsequently injection molded sole and heel. In fact, polymerized urethane, or polyurethanes, have proven to have a remarkable affinity for a great variety of shoe materials.

It will be apparent that many departures may be made from the specific illustrative embodiments of the invention disclosed herein without departing from the spirit of the invention as defined in the appended claims.

What is claimed is:

1. A proces for producing a shoe having a sole adhesively bonded to the upper, which comprises positioning a shoe upper and a shoe sole, at least one of which is made of a plasticized polymeric material, in assembled relation to one another by superimposing a shoe upper and a shoe sole with an incompletely polymerized polyurethane interposed therebetween, and securing the sole to the upper by inducing further polymerization of the polyurethane.

2. A proces for producing a shoe having a preformed sole and heel adhesively bonded to the upper, which comprises positioning a shoe upper and a preformed shoe sole and heel, at least one of which is made of a plasticized polymeric material, in assembled relationship to one another by superimposing a shoe upper and a preformed shoe sole and heel with an incompletely polymerized polyurethane interposed therebetween, and securing the sole and heel to the upper by inducing further polymerization of the polyurethane.

3. A process for producing a shoe having a heel adhesively bonded thereto, which comprises positioning a shoe upper and a shoe heel, at least one of which is made of a plasticized polymeric material, in assembled relation to one another by superimposing a shoe upper and a shoe heel with an incompletely polymerized polyurethane interposed therebetween, and securing the heel to the upper by inducing further polymerization of the polyurethane.

4. A process for producing a shoe having a sole and heel adhesively bonded thereto which comprises positioning a shoe upper made of a plasticized polyvinyl resin and a shoe sole and heel made of a plasticized polyvinyl resin with an incompletely polymerized polyurethane therebetween, and securing the sole and heel to the upper by inducing further polymerization of the polyurethane.

5. The process of claim 1 wherein the polyurethane is derived from a hydroxy-rich compound selected from the group consisting of polyesters and polyethers and a polyisocyanate.

References Cited in the file of this patent

UNITED STATES PATENTS

| | | |
|---|---|---|
| 2,683,144 | Balon et al. | July 6, 1954 |
| 3,021,543 | Crowley | Feb. 20, 1962 |